Patented July 29, 1952

2,605,291

UNITED STATES PATENT OFFICE 2,605,291

β-HYDROXYDIALKYL PEROXIDES

Maurice R. Barusch, Richmond, and Jack Q. Payne, Concord, Calif., assignors to California Research Corporation, San Francisco, Calif., a corporation of Delaware No Drawing. Application July 17, 1950, Serial No. 174,357

10 Claims. (Cl. 260—610)

This invention relates to new and useful organic peroxides and to a method for producing them. More particularly, it relates to β-hydroxydialkyl peroxides having structures illustrated by the formulae in which R and R' may be alkyl or aralkyl groups or hydrogen atoms:

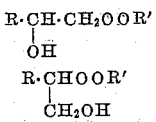

It has been found that β-hydroxydialkyl peroxides may be prepared by condensing an epoxyalkane having the oxygen linked to two adjacent carbon atoms with an alkyl hydroperoxide. The reaction occurring in the formation of the β-hydroxydialkyl peroxides may be illustrated as follows:

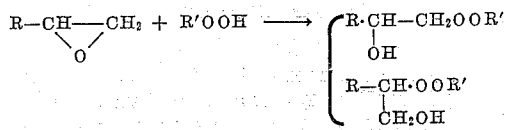

As shown in the above equation two isomeric β-hydroxydialkyl peroxides may be produced during the reaction, one having the carbinol group arranged in a primary alcohol structure and the other having the carbinol group arranged in a secondary alcohol structure, depending upon which epoxide carbon oxygen bond is broken in the reaction. The reaction is facilitated by the employment of catalysts, alkalies and mineral acids being especially effective. When an acid catalyst is employed, both isomers are formed and when a basic catalyst is employed the isomer having the carbinol group in secondary alcohol structure predominates in the product.

The following examples are provided to illustrate the manner in which the formation of the β-hydroxydialkyl peroxides of the invention may be prepared. It should be understood that the specific reactants employed in the examples are illustrative only and not limiting, since the reaction is essentially a reaction between the functional groups of the respective reactants and proceeds almost independently of a specific size or character of the hydrocarbon portion of the molecules of the reactants.

Example 1

1 mol of ethylene oxide and 50 cc. of ethylether were introduced into a 500 cc. round bottom flask fitted with a mercury sealed stirrer, dropping funnel, and a condenser. The flask was immersed in an ice bath and the contents were cooled to a temperature below 40° F. 15 milliliters of a 40% solution of potassium hydroxide in water were introduced into the flask. 0.33 mol of tertiary butyl hydroperoxide were introduced into the flask drop-wise controlling the rate of introduction to maintain the temperature below about 50° F. On completion of the addition, the reaction mixture was allowed to come to room temperature and then was slowly heated to reflux in a hot water bath. The mixture was stirred continuously during the heating. Heating was continued for approximately 2 hours during which period the caustic layer developed a brown color. Purification was accomplished by vacuum fractionation. β-hydroxyethyl tertiary butyl peroxide was formed during the reaction.

Example 2

The procedure described in Example 1, omitting only the introduction of the ether, was followed in this example. 0.67 mol of 1,2-propylene oxide were contacted with 0.17 mol of tertiary butyl hydroperoxide in the presence of 10 cc. of 40% aqueous potassium hydroxide. β-hydroxypropyl tertiary butyl peroxide was formed during the reaction.

Example 3

Following the procedure of Example 2, 1,2-isobutylene oxide was reacted with tertiary butyl hydroperoxide. 1 mol of the epoxide and 0.42 mol of the hydroperoxide were contacted in the presence of 20 cc. of 40% aqueous potassium hydroxide. β-hydroxyisobutyl tertiary butyl peroxide was produced during the reaction.

The properties of the β-hydroxydialkyl peroxides produced in the above examples and combustion analytical data are tabulated below.

|  | Refractive Index $N_{20}^D$ | Density $d_4^{20}$ | Boiling Point, °F. | Calculated | | Found | |
| --- | --- | --- | --- | --- | --- | --- | --- |
|  |  |  |  | Percent C. | Percent H | Percent C. | Percent H |
| β-hydroxyethyl tert. butyl peroxide | 1.4249 | 0.9561 | 99 at 2 mm. | 53.71 | 10.52 | 53.79 | 10.49 |
| β-hydroxypropyl tert. butyl peroxide | 1.4184 | 0.9296 | 99 at 2.5 mm. | 56.73 | 10.88 | 57.55 | 10.75 |
| β-hydroxyisobutyl tert. butyl peroxide | 1.4165 | 0.9085 | 99 at 4 mm. | 59.23 | 11.12 | 59.60 | 11.23 |

Solid derivatives of the β-hydroxyethyl and the β-hydroxypropyl tertiary butyl peroxides were prepared. In both cases the 3,5-dinitrobenzoate was synthesized for this purpose. Melting points and analytical data for these materials are tabulated below.

| | Melting Point, °F. | Calculated | | | Found | | |
|---|---|---|---|---|---|---|---|
| | | Percent C. | Percent H | Percent N | Percent C. | Percent H | Percent N |
| β-hydroxyethyl tert. butyl peroxide | 146 | 47.56 | 4.91 | 8.53 | 47.32 | 4.99 | 8.67 |
| β-hydroxypropyl tert. butyl peroxide | 192 | 49.12 | 5.30 | 8.18 | 49.4 | 5.2 | 8.3 |

It has been ascertained that the reaction of the invention as illustrated in the above examples is essentially one in which the oxirane ring of the epoxyalkane reacts with the hydroperoxide group of the alkyl hydroperoxide. Their reaction may be illustrated as follows:

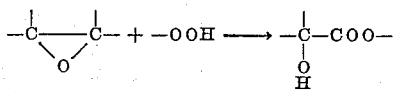

The presence of longer alkyl chains in the hydroperoxide appears to have no appreciable effect on the rate of reaction or yields obtained. Similarly, the length of the alkane chain of the epoxyalkane molecule has little effect upon the course of the reaction. Higher epoxides, such as those of U. S. Patent No. 2,457,328, may be employed in the reaction. Further, the alkyl portion of the alkyl hydroperoxide and of the epoxyalkane may be substituted by aryl groups attached to carbon atoms other than the carbon atoms of the oxirane ring and the carbon atom directly attached to the hydroperoxide group. It has been observed that the reaction of the 1,2-epoxides is more rapid and more complete than that of epoxides in which the oxygen is linked to adjacent carbon atoms in the central portion of the alkane chain; this lower activity of these latter epoxides is perhaps due to steric effects. Accordingly, it is preferred to employ 1,2-epoxyalkanes in the reaction.

When the reaction is conducted with the aid of catalysts, it is preferred to employ alkaline materials such as the alkali metal hydroxides and carbonates and the alkaline earth metal hydroxides, or mineral acids such as hydrochloric, sulfuric, and phosphoric acids to catalyze the reaction. These catalytic materials are preferably employed in aqueous solution.

In the conduct of the reaction of this invention high temperatures are avoided because of the recognized instability of the hydroperoxide reactants. Ordinarily, temperatures below 100° F. are employed, but higher temperatures may be employed where the stability of the particular hydroperoxide used is fairly high.

The β-hydroxydialkyl peroxides of this invention have a variety of attractive uses. They may be employed as diesel fuel additives to effect cetane number improvement. The β-hydroxydialkyl peroxides produced in the above examples were added to diesel fuels in amount sufficient to constitute 0.3% by weight of the total fuel. Cetane number increases ranging from 5.9 to 6.3 were obtained by their employment in a 43 cetane fuel at this concentration. The β-hydroxydialkyl peroxides may also be employed as polymerization catalysts and produce novel effects in this use, presumably by reason of the presence of two functional groups in the molecules. The peroxides of this invention undergo further condensation reactions with epoxides such as ethylene oxide and they may be reacted with hydrogen peroxide or with hydroperoxides to prepare novel polyperoxidic materials such as:

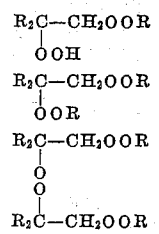

These polyperoxides may themselves be employed as polymerization catalysts or as synthetic intermediates.

We claim:

1. β-hydroxydialkyl peroxides.
2. Peroxides having the formula

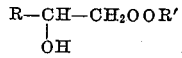

wherein R is a member of the group consisting of alkyl and aralkyl radicals and hydrogen and R is a member of the group consisting of alkyl and aralkyl radicals.

3. Peroxides having the formula

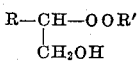

wherein R is a member of the group consisting of alkyl and aralkyl radicals and hydrogen and R' is a member of the group consisting of alkyl and aralkyl radicals.

4. The method of producing β-hydroxydialkyl peroxides which comprises condensing an epoxyalkane having the oxygen linked to two adjacent carbon atoms with an alkyl hydroperoxide.

5. The method of producing β-hydroxydialkyl peroxides which comprises condensing a 1,2-epoxyalkane with an alkyl hydroperoxide.

6. The method as defined in claim 4, wherein the condensation is catalyzed with a basic catalyst selected from the group consisting of alkali metal hydroxides, alkali metal carbonates and alkaline earth metal hydroxides.

7. The method as defined in claim 4, wherein the condensation is catalyzed by a mineral acid.

8. The method as defined in claim 5, wherein the condensation is catalyzed with a basic catalyst selected from the group consisting of alkali metal hydroxides, alkali metal carbonates and alkaline earth metal hydroxides.

9. The method as defined in claim 5, wherein the condensation is catalyzed by a mineral acid.

10. Peroxides having the formula

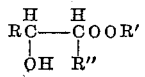

wherein R and R'' are members of the group consisting of alkyl and aralkyl radicals and hydrogen and R' is a member of the group consisting of alkyl and aralkyl radicals.

MAURICE R. BARUSCH.
JACK Q. PAYNE.

REFERENCES CITED

The following references are of record in the file of this patent:

UNITED STATES PATENTS

| Number | Name | Date |
|---|---|---|
| 2,115,206 | Milas | Apr. 26, 1938 |
| 2,115,207 | Milas | Apr. 26, 1938 |
| 2,298,405 | Milas | Oct. 13, 1942 |
| 2,455,569 | Dickey | Dec. 7, 1948 |
| 2,537,853 | Pezzaglia | Jan. 9, 1951 |
| 2,562,897 | Ellingboe | Aug. 7, 1951 |